(12) United States Patent
Ferrer et al.

(10) Patent No.: US 7,568,672 B2
(45) Date of Patent: Aug. 4, 2009

(54) SELECTIVELY ADJUSTABLE MOUNTING ASSEMBLY

(75) Inventors: Vincent J. Ferrer, Pittsford, NY (US); Stephen Glaser, Pittsford, NY (US); David Alan Vogler, Rochester, NY (US)

(73) Assignee: Vuzix Corporation, Rochester, NY (US)

( * ) Notice: Subject to any disclaimer, the term of this patent is extended or adjusted under 35 U.S.C. 154(b) by 22 days.

(21) Appl. No.: 11/760,557

(22) Filed: Jun. 8, 2007

(65) Prior Publication Data

US 2008/0302937 A1    Dec. 11, 2008

(51) Int. Cl.
*A47F 5/00* (2006.01)
(52) U.S. Cl. ............... 248/288.31; 248/229.1; 248/229.11; 248/229.14; 248/229.2; 248/229.21; 248/688; 248/278.1
(58) Field of Classification Search .............. 248/229.1, 248/229.11, 229.14, 229.2, 229.21, 288.31, 248/688, 278.1
See application file for complete search history.

(56) References Cited

U.S. PATENT DOCUMENTS

| | | | | |
|---|---|---|---|---|
| 1,382,783 A * | 6/1921 | Howard | ................... | 248/276.1 |
| 2,460,880 A * | 2/1949 | Geizer et al. | ................... | 403/54 |
| 2,650,788 A * | 9/1953 | Hulstein | ................ | 248/231.71 |
| 3,240,516 A * | 3/1966 | Barish et al. | ................... | 403/54 |
| 3,843,083 A * | 10/1974 | Angibaud | .............. | 248/229.14 |
| 4,231,117 A | 11/1980 | Aileo | | |
| 4,307,864 A * | 12/1981 | Benoit | ................... | 248/222.11 |
| 4,606,522 A * | 8/1986 | Heifetz | ................... | 248/276.1 |
| 5,257,094 A | 10/1993 | LaRussa | | |
| 5,383,738 A | 1/1995 | Herbermann | | |
| 5,419,522 A | 5/1995 | Luecke et al. | | |
| 5,581,806 A | 12/1996 | Capdepuy et al. | | |
| 5,794,897 A * | 8/1998 | Jobin et al. | ................. | 248/74.4 |
| 5,845,885 A * | 12/1998 | Carnevali | ................. | 248/181.1 |
| 6,017,010 A * | 1/2000 | Cui | ....................... | 248/288.31 |
| 6,052,832 A | 4/2000 | Crompton | | |
| 6,220,556 B1 * | 4/2001 | Sohrt et al. | .............. | 248/279.1 |
| 6,581,892 B2 * | 6/2003 | Carnevali | ................. | 248/276.1 |
| 6,601,813 B1 * | 8/2003 | Kager et al. | ................ | 248/314 |
| 7,090,181 B2 * | 8/2006 | Biba et al. | ............. | 248/288.31 |
| 7,100,881 B2 | 9/2006 | Worrall | | |
| 7,178,421 B2 * | 2/2007 | Filipiak et al. | ........... | 74/490.05 |
| 7,193,783 B2 | 3/2007 | Willey et al. | | |

* cited by examiner

*Primary Examiner*—J. Allen Shriver, II
*Assistant Examiner*—Michael McDuffie
(74) *Attorney, Agent, or Firm*—Stephen B. Salai, Esq.; Michael J. Didas, Esq.; Harter Secrest & Emery LLP

(57) ABSTRACT

An adjustable attachment mechanism includes an elongate shaft, first and second seats disposed on opposite ends of the shaft, first and second collars, and an actuator. The first and second collars are disposed to translate along the elongate shaft. An inner surface of the first collar cooperates with the first seat to define a first receptacle and an inner surface of the second collar cooperates with the second seat to define a second receptacle. The actuator is in communication with the first and second collars and is actuable to selectively traverse the first and second collars along the shaft in a first direction away from each other and in a second direction toward each other, the movement in the first direction loosening the first and second receptacles and the movement in the second direction tightening the first and second receptacles.

14 Claims, 4 Drawing Sheets

SELECTIVELY ADJUSTABLE MOUNTING ASSEMBLY

TECHNICAL FIELD

The present invention relates to adjustable mounting assemblies. More specifically, the present invention relates to an assembly for mounting two articles and facilitating selective positioning of the articles with respect to each other.

BACKGROUND OF THE INVENTION

Conventional mechanisms are known to adjustably mount a number of devices. Ball and socket joints, brackets, couplers, and variations thereof all have been used for various mounting needs.

Recently, advances have been made in the field of optics and display technologies such that that personal video display devices have become increasingly useful for entertainment purposes and for tactical, e.g., military, purposes. For example, conventionally known are display engines approximately one inch high by two inches wide by two inches deep that display images and information. Such small displays are placed proximate a user's eye preferably out of a main line of sight, so as to be available for reference, but not to impede normal vision.

There is a need in the art for an improved assembly capable of mounting two articles relative to each other. There also is a need in the art for an assembly capable of mounting personal video displays and providing easy and reliable positioning of the video displays.

SUMMARY OF THE INVENTION

The present invention addresses the foregoing needs in the art by providing a selectively adjustable mounting assembly.

According to a first aspect of the invention, an adjustable attachment mechanism includes an elongate shaft, first and second seats disposed on opposite ends of the shaft, first and second collars, and an actuator. The first and second collars are disposed to translate along the elongate shaft. An inner surface of the first collar cooperates with the first seat to define a first receptacle and an inner surface of the second collar cooperates with the second seat to define a second receptacle. The actuator is in communication with the first and second collars and is actuable to selectively traverse the first and second collars along the shaft in a first direction away from each other and in a second direction toward each other, the movement in the first direction loosening the first and second receptacles and the movement in the second direction tightening the first and second receptacles.

According to another aspect of the invention, an adjustable attachment mechanism includes an elongate shaft, first and second collars, and an actuator. The elongate shaft has a first seat at one end and a second seat at the other end. The first and second collars are disposed on the shaft and translatable along a length of the shaft. The first and second collars each have a receiving area and a threaded portion, and are disposed on the shaft such that the receiving area of the first collar and the first seat define a first receptacle and the receiving area of the second collar and the second seat define a second receptacle. The actuator is rotatable about the elongate shaft. The actuator has a first threaded portion disposed to cooperate with the threaded portion of the first collar and a second threaded portion disposed to cooperate with the second threaded portion of the second collar. The threaded portion of the first collar and the threaded portion of the second collar are oppositely threaded such that when the actuator is rotated in a first direction, the threaded engagements of the actuator to the first and second collars cause the first and second collars to move along the shaft away from each other, and when the actuator is rotated in a second direction opposite the first direction, the threaded engagements of the actuator to the first and second collars cause the first and second collars to move along the shaft toward each other.

An understanding of these and other features of the Applicants' invention may be had with reference to the attached figures and following description, in which the present invention is illustrated and described.

BRIEF DESCRIPTION OF THE DRAWING FIGURES

DETAILED DESCRIPTION OF THE INVENTION

Preferred embodiments of the invention now will be described with reference to the accompanying figures.

Figure 1:
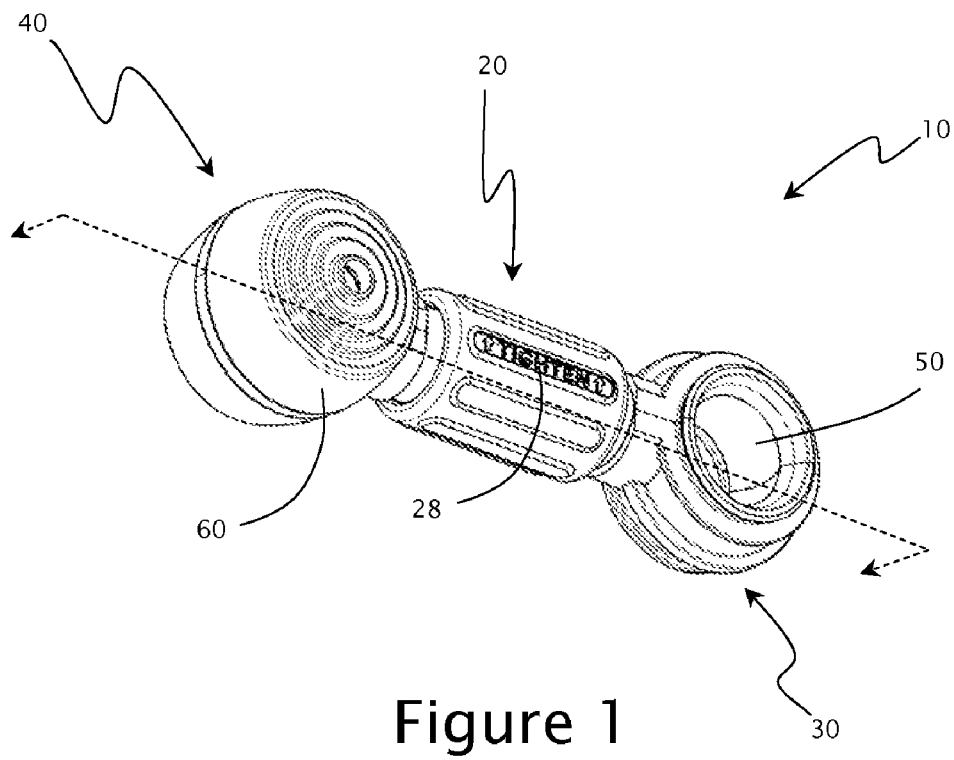
FIG. 1 is a perspective view of an adjustable mounting assembly according to a preferred embodiment of the invention.

As illustrated in FIG. 1, a preferred adjustable mounting assembly 10 generally includes an adjustment mechanism 20 disposed between opposing collars 30, 40. Each of the collars 30, 40 defines a receptacle 50 for receiving an article to be mounted. (In FIG. 1, the receiving area of the collar 40 is obscured by a shroud 60.) As will be described below in more detail, the mounting assembly 10 generally operates by actuating the adjustment mechanism 20 to loosen the collars 30, 40, thereby allowing an object contained within the receptacle to be selectively adjusted. When a desired positioning of the article is achieved, the adjusting mechanism 20 is actuated to tighten the collars 30, 40 and clamp the object contained therein.

Figure 2:
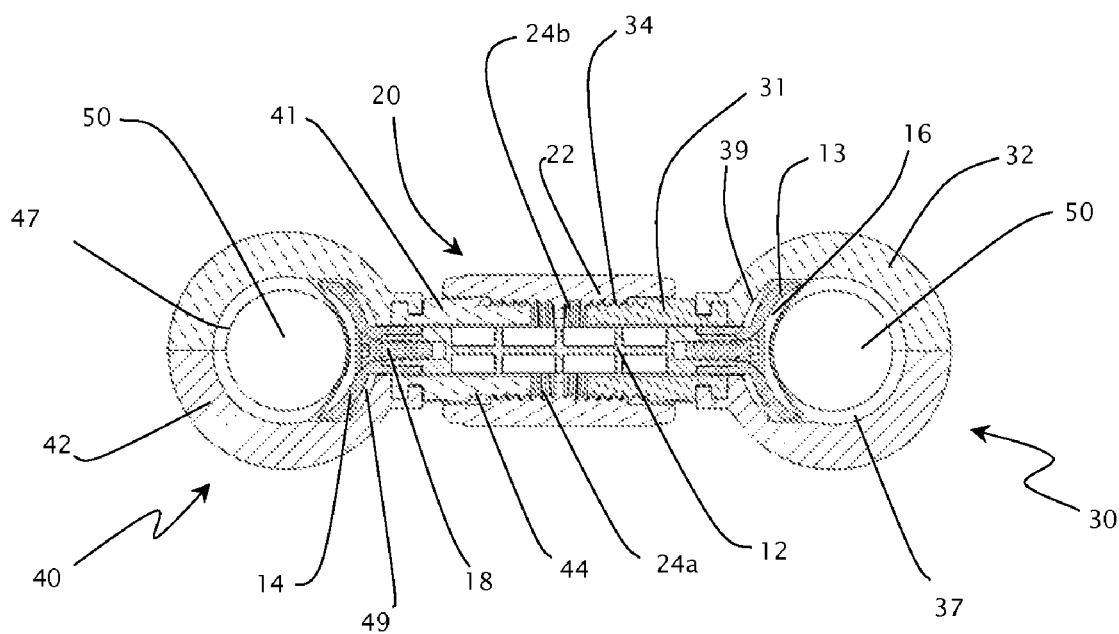
FIG. 2 is a cross-sectional elevation view of the adjustable mounting assembly illustrated in FIG. 1.
Figure 3:
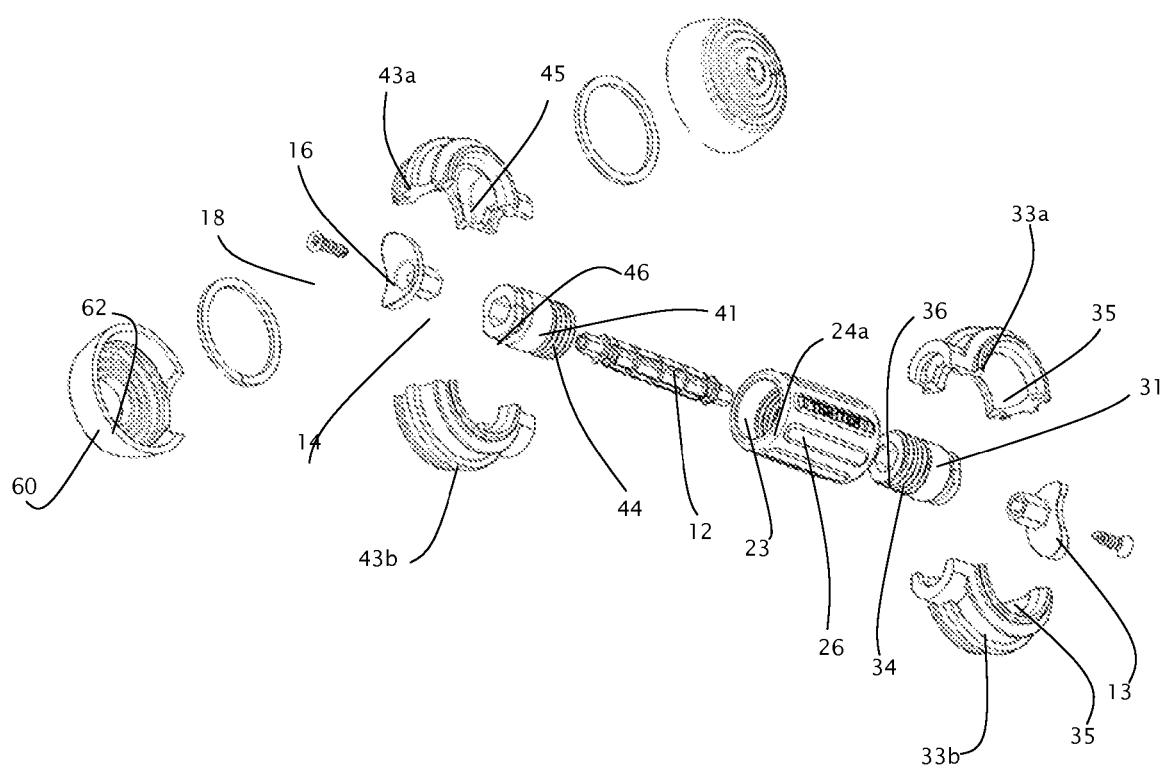
FIG. 3 is an exploded perspective view of the adjustable mounting assembly illustrated in FIG. 1.

FIG. 2 is an exploded view of the mounting assembly 10 and FIG. 3 is a cross-sectional view of the mounting assembly 10. These figures illustrate the components making up the assembly.

As shown in FIGS. 2 and 3, an elongate shaft 12 is disposed at the center of the mounting assembly, and first and second seats 13, 14 are fixed at ends of the shaft 12. Each of the first and second seats 13, 14 includes a generally concave surface 16, the respective concave surfaces 16 generally being disposed to face away from each other. Known fasteners, such as screws 18, preferably are used to secure the seats 13, 14 to the ends of the elongate shaft 12. Alternatively, the shaft 12 and the seats 13, 14 may be formed as a unitary piece.

The first and second collars 30, 40 are arranged proximate the seats 13, 14, respectively. The first collar 30 generally includes a base 31 and a receiving portion 32 joined thereto. The base 31 and the receiving portion 32 may be formed as separate pieces, as depicted in the drawings, or they may comprise a single piece. The base 31 has a threaded portion 34 on an external surface. The function of the threaded portion 34 will be described in more detail below.

The illustrated receiving portion 32 consists of two halves 33a, 33b, which preferably are joined to form a substantially unitary piece. (The two halves generally are used for ease of manufacturing ad ease of assembly, but the receiving portion alternatively may be formed as a unitary piece.) Each of the halves 33a, 33b has an inner surface that is generally frusto-spherical or frusto-spheroidal. When the two halves 33a, 33b are joined, the receiving portion 32 has an internal, generally frusto-spherical surface 35 substantially symmetrical about an equator. The surface 35 defines an opening 37. A bore 39 preferably is formed in the surface proximate the base 31 for receiving the seat 13, as will be described in more detail below. An aperture 36 preferably is formed through the receiving portion 32, and more specifically, through the base 31 of the receiving portion 32. The aperture 36 is sized and shaped to create a sliding engagement of the receiving portion 32 on the shaft 12. In this manner, the collar 30 is movable on the shaft 12.

The second collar 40 is substantially identical to the first collar 30. Specifically, the second collar 40 includes a base 41 and a receiving portion 42 having two halves 43a, 43b. An inner, curved surface 45 of the receiving portion 42 defines an opening 47, and a bore 49 is formed in the surface 45 proximate the base 41. The base 41 has a threaded area or portion 44. An aperture 46 is formed through the base 41 and allows the collar 40 to move along the shaft 12. Preferably, the only difference between the first and second collars 30, 40 is that the threads comprising the threaded area 34, 44 are opposite, i.e., one of the threads is right-handed and the other of the threads is left-handed.

Thus, the preferred collars 30, 40 include apertures 36, 46 that form a clearance fit with the outer surface of the shaft, thereby allowing the collars to slide along an exterior of the shaft. In the preferred embodiment, the cross-section of the shaft taken transverse to the axial length of the shaft is non-circular (hexagonal in the figures) and the apertures 36, 46 have complementary shapes. When configured in this manner, rotation of the collars 30, 40 is substantially impeded, but the collars are free to traverse along the length of the shaft 12.

In the preferred embodiment, the threaded areas 34, 44 of the collars 30, 40 cooperate with first and second threaded portions 24a, 24b of the adjustment mechanism 20. The adjustment mechanism 20 is made up of a substantially cylindrical wall 22 having an aperture 23 axially therethrough. The aperture 23 is sized to allow passage of the shaft 12 through the adjustment mechanism 20. The threaded portions 24a, 24b are formed on an inside of the cylindrical wall 22, proximate ends thereof. As indicated above, the first threaded portion 24a engages the threaded area of the first collar 30 and the second threaded portion 24b engages the threaded area of the second collar 40. Because the threads on the respective collars 30, 40 preferably are opposite threads, the threaded portions 24a, 24b of the adjustment mechanism 20 also has opposite threads in the preferred embodiment.

The adjustment mechanism also may include a gripping surface 26 and/or indicia 28. The gripping surface 26 preferably promotes actuation of the adjustment mechanism 20 by a user. The gripping surface may be raised or indented with respect to the outer surface of the cylindrical wall 22, and/or it may be patterned, knurled, or the like. The indicia 28 preferably provides instruction to the user, for example, instruction regarding actuation directions or the like. Alternatively or additionally, the indicia may be ornate and for aesthetic purposes only.

To construct the adjustable mounting assembly, the shaft 12 is first passed through the aperture 23 of the adjustment mechanism 20. The base portions 31, 41 of the first and second collars 30, 40 are then respectively passed over opposite ends of the shaft 12 on opposite ends of the adjustment mechanism The bases 31, 41 are oriented such that the threaded areas 34, 44 are adjacent the adjustment mechanism 20. The receiving portions 32, 42 then are placed on the bases 31, 41 and the seats 13, 14 are secured to the ends of the shaft with their concave surfaces 16 directed away from each other, i.e., outwardly along an axis of the shaft. Moreover, the seats 13, 14 maintain the collars 30, 40 on the shaft 12. The seats 13, 14 are received in the bores 39, 49 of the receiving portions 32, 42, and the concave surfaces 16 of the seats 13, 14 generally align with the inner surfaces 35, 45 of the receiving portions 32, 42 to form the receptacles 50.

As described above, the collars 30, 40 preferably are engaged with the adjustment mechanism 20 via the threads. Actuation, i.e., rotation, of the adjustment mechanism about the shaft 12 in a first direction causes the collars to move along the shaft either in a direction closer to each other or in a direction away from each other, while actuation of the adjustment mechanism in the second direction opposite the first direction causes the collars to move in the opposite directions. As should be appreciated, when the adjustment mechanism is actuated to move the collars respectively away from each other, the receiving portions are moved relatively outwardly, with a bottom of the bore 39, 49 approaching a side of the seat 13, 14 opposite the concave surface 16, effectively widening the receptacle 50, or loosening the mounting assembly 10. Conversely, when the adjustment mechanism is actuated to move the collars respectively closer to each other, the portion of the surfaces 35, 45 of the receiving portions 32, 42 facing the concave surface 16 of the respective seat 13, 14 is moved relatively closer to that concave surface (i.e., the bottom of the bore is distanced from the side of the seat opposite the concave surface), thereby effectively narrowing the receptacle 50, or tightening the mounting assembly 10. When tightened, the collars 30, 40 are moved such that the seats 13, 14 and the curved surfaces 35, 45 clamp an article in the receptacle. Put another way, movement of collars 30, 40 causes relative movement of the seats 13, 14 within the bores 39, 49 of the respective collar to effectively enlarge or reduce an internal dimension of the receptacle 50 between the concave surface 16 of the seat 13, 14 and an opposing portion of the curved surfaces 35, 45.

Figure 4:
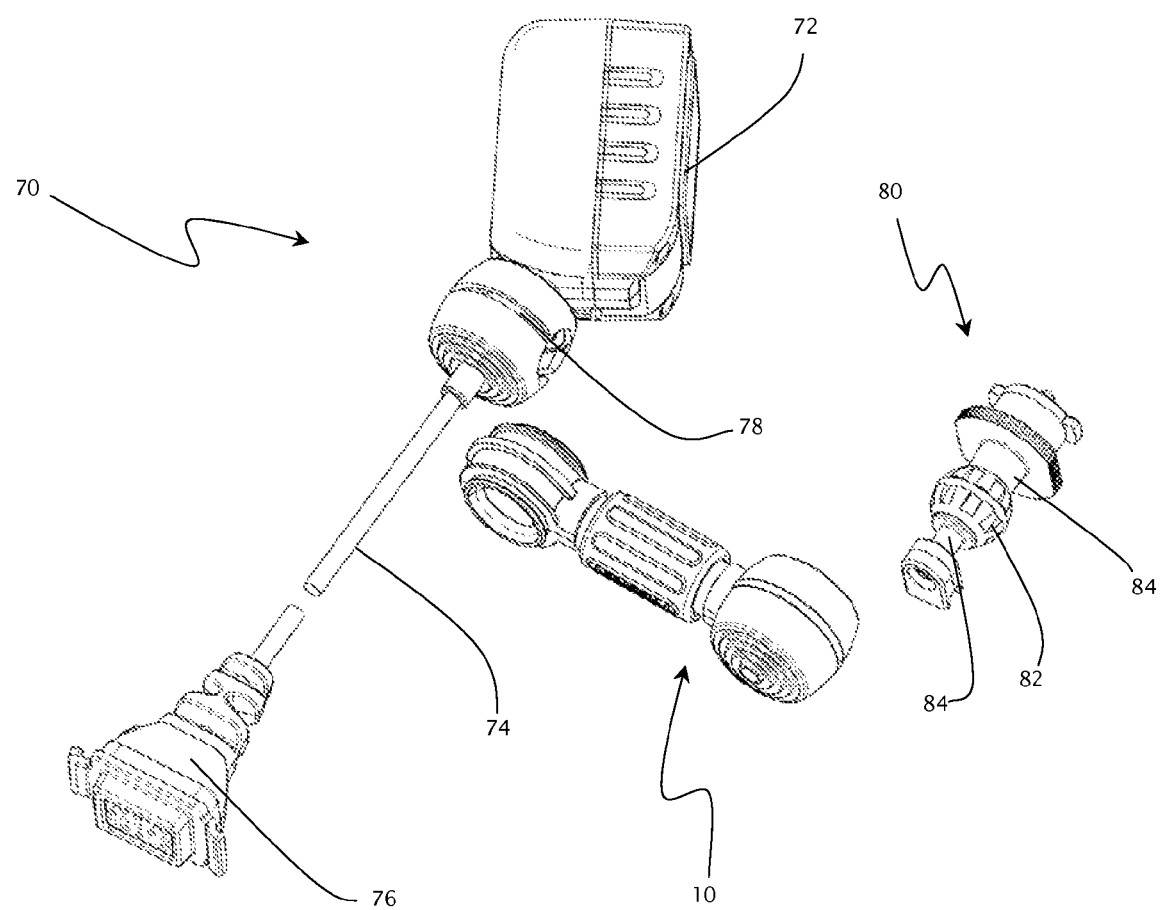
FIG. 4 is an exploded perspective view of the adjustable mounting assembly of FIG. 1 as used in conjunction with an optical device and a coupler.

The receptacle preferably receives a ball joint formed on an article to be mounted, such as the ball joint 82 formed on a mount 80, as illustrated in FIG. 4. With the ball joint 82 received in the receptacle, the adjustment mechanism 20 preferably is actuated to loosen the mounting assembly 10, as described above. When the mounting assembly 10 is loosened, the ball is movable within the receptacle, but preferably is maintained within the receptacle 50. In this manner, the ball may be manipulated within the receptacle to a desired position. Once in the desired location, the adjustment mechanism preferably is actuated to tighten the mounting assembly 10, thereby maintaining the ball (and attached device) in the desired position, i.e., by clamping the ball between the curved inner surface of the receiving portion and the concave surface of the seat.

Figure 5:
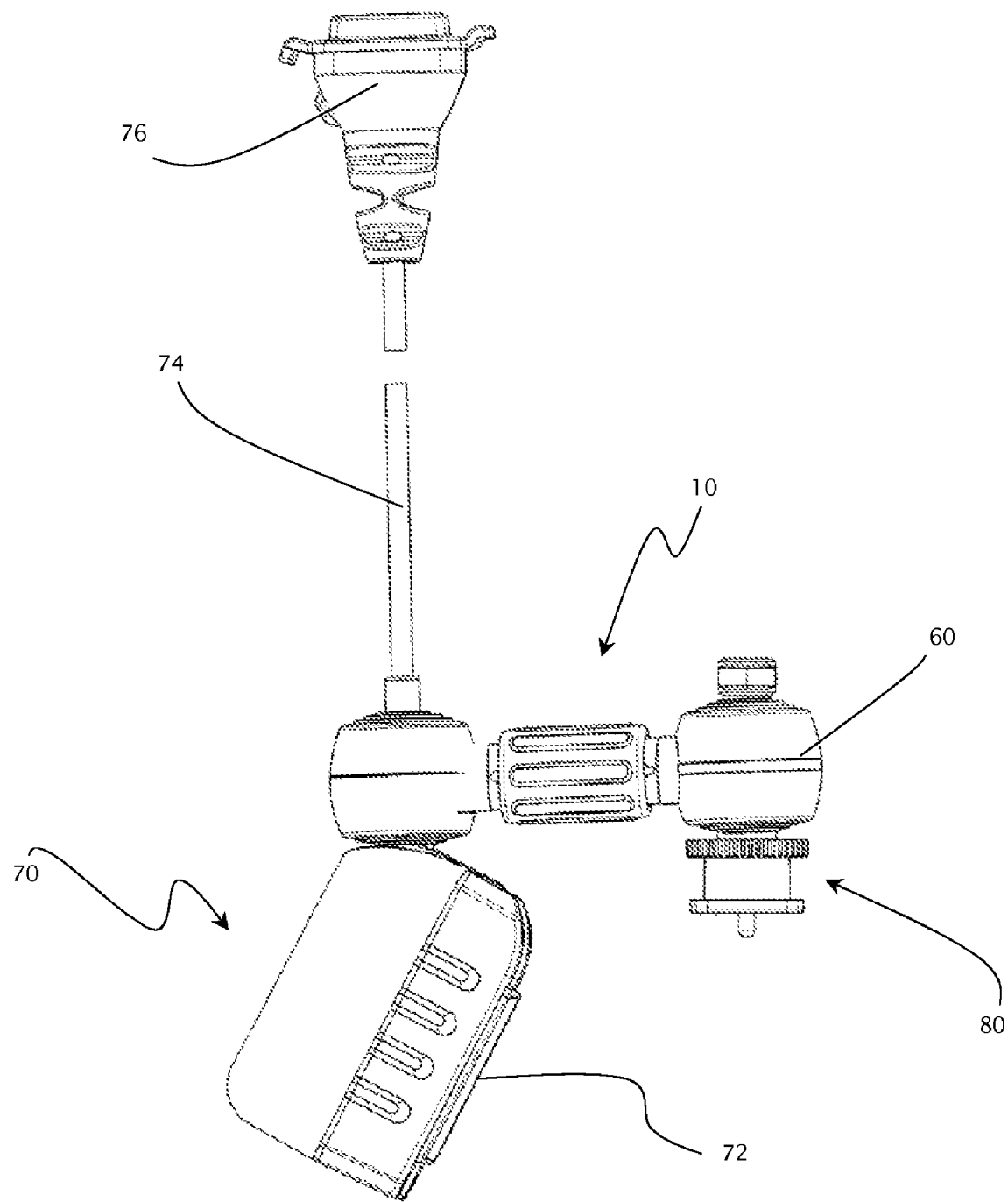
FIG. 5 is a top plan view of the assembly illustrated in FIG. 4.

As illustrated in FIGS. 4 and 5, the preferred adjustable mounting assembly is particularly useful for mounting a personal video display device 70 to goggles, a helmet, or other devices (not shown) worn on, about, or proximate one's head. More specifically, the first collar 30 of the mounting assembly 10 retains a display device 70 and the second collar retains a coupler 80. The display device 70 generally includes a viewing pane through which images or other information is viewed, a cable 74 for sending/receiving information to/from a source (not shown), a connector 76 for interfacing with the source, and a ball mount 78 received in the receptacle 50 of the first collar 30. The coupler 80 may be of any construction for attaching the assembly to headgear, such as goggles, a helmet, or the like, and includes a ball mount 82 received in the receptacle 50 of the second collar 40. When the display device 70 and the coupler 80 are retained in the respective receptacles, the coupler 80 is coupled to a user's headgear, thereby mounting the display device 70. The user then actuates the adjustment mechanism, as described above, to loosen the mounting assembly 10, positions the display device 70 in a desired viewing position, and tightens the mounting assembly 10 to retain the display device 70 in the desired viewing position.

In the preferred embodiments, the ball mounts 78, 82 are movable within the receptacle over a relatively large range of motion. As will be appreciated, however, this range of motion is limited both by the width of the receiving portion 32, 42 and the size of any attachments extending radially from the ball mount 78, 82 proximate the receiving portion. For example, when the cable 74 is passed through the ball mount 78 as shown in FIGS. 4 and 5, movement of the display device within the receptacle will be impeded when the cable 74 contacts the receiving portion 32. This may be cured by routing the cable 74 outside the assembly 10 altogether, although such an arrangement is less compact. Protrusions 84 used in the operation of the coupler 80 pose motion impediment problems similar to those resulting from the cable 74. Namely, as the coupler 80 is moved within the collar, the protrusions 84 eventually will contact the receiving portion 42, disallowing further movement of the coupler 80 in a direction. Limiting the diameter of the cable 74 and any protrusions 84 will increase the range of motion of the respective devices.

As also illustrated in the figures, the adjustable mounting assembly may include one or more shrouds 60. The shrouds 60 preferably are disposed over the receptacles 50. The shrouds preferably aid in retaining the ball joints within the receptacle and/or they may help to prevent dust, moisture or any other foreign matter from entering the receptacle 50. Preferably, an aperture 62 is formed in each shroud 60 through which features, e.g., the cable 74 and the protrusions 84, of the device to be mounted is passed. The shrouds 60 preferably are pliable, and thus impart only limited resistance to adjustment of the mounted devices.

Although the present invention has been described in conjunction with mounting display devices on head gear, the invention is not limited to this use. It is contemplated that the device may be used in any number of applications in which a relatively large degree of adjustability is desirable between two articles.

Modifications to the described invention also are contemplated. For instance, while the preferred embodiment of the invention features two collars, or clamping assemblies, it may be desirable only to provide a single clamping assembly. In such an embodiment, only one clamp may be used, or one of the clamps may be fixed, and thereby unaffected by actuation of the adjustment mechanism.

In the preferred embodiment illustrated, internal threads are formed on the adjustment mechanism and external threads are formed on the collars 30, 40. Alternatively, the threads on the adjustment mechanism could be external with the threads on the collars being internal, i.e., formed on an inner wall of a bore or the like.

Also in the preferred embodiment, the receptacles 50 generally are frusto-spherical for receiving a ball joint, such that the device acts generally like a ball-and-socket joint. However, the surface and the received joint may be any number of geometrical shapes or surfaces providing relative movement. For example, it is contemplated that movement in only a single plane may be desirable in which case the interface between the receptacle and the joint may include a slot or movement may be otherwise constrained.

The foregoing embodiments of the invention are representative embodiments, and are provided for illustrative purposes. The embodiments are not intended to limit the scope of the invention. Variations and modifications are apparent from a reading of the preceding description and are included within the scope of the invention. The invention is intended to be limited only by the scope of the accompanying claims.

We claim:

1. An adjustable attachment mechanism comprising:
   an elongate shaft;
   first and second seats disposed on opposite ends of the shaft;
   first and second collars disposed to translate along the elongate shaft, an inner surface of the first collar cooperating with the first seat to define a first receptacle and an inner surface of the second collar cooperating with the second seat to define a second receptacle;
   an actuator in communication with the first and second collars actuable to selectively traverse the first and second collars along the shaft in a first direction away from each other and in a second direction toward each other, the movement in the first direction loosening the first and second receptacles and the movement in the second direction tightening the first and second receptacles; and
   a shroud covering a portion of the receptacle.

2. An adjustable attachment mechanism comprising:
   an elongate shaft;
   first and second seats disposed on opposite ends of the shaft;
   first and second collars disposed to translate along the elongate shaft, an inner surface of the first collar cooperating with the first seat to define a first receptacle and an inner surface of the second collar cooperating with the second seat to define a second receptacle; and
   an actuator in communication with the first and second collars actuable to selectively traverse the first and second collars along the shaft in a first direction away from each other and in a second direction toward each other, the movement in the first direction loosening the first and second receptacles and the movement in the second direction tightening the first and second receptacles,
   wherein the actuator comprises mating threads formed on the first and second collars and the actuator.

3. The mechanism according to claim 2, wherein the threads on the first collar are opposite the threads formed on the second collar.

4. The mechanism according to claim 3, wherein the surface of the first collar is one of frusto-spherical and frusto-spheroidal to receive a ball joint of a device to be mounted.

5. An adjustable attachment mechanism comprising:
   an elongate shaft having a first seat at one end and a second seat at the other end;
   first and second collars disposed on the shaft and translatable along a length of the shaft, the first and second collars each having a receiving area and a threaded portion, the first and second collars being disposed on the shaft such that the receiving area of the first collar and the first seat define a first receptacle and the receiving area of the second collar and the second seat define a second receptacle; and an actuator rotatable about the elongate shaft, the actuator having a first threaded portion disposed to cooperate with the threaded portion of the first collar and a second threaded portion disposed to cooperate with the second threaded portion of the second collar, wherein the threaded portion of the first collar and the threaded portion of the second collar are oppositely threaded such that when the actuator is rotated in a first direction, the threaded engagements of the actuator to the first and second collars cause the first and second collars to move along the shaft away from each other, and when the actuator is rotated in a second direction opposite the first direction, the threaded engagements of the actuator to the first and second collars cause the first and second collars to move along the shaft toward each other.

6. The attachment mechanism of claim 5, wherein the actuator comprises a substantially cylindrical inner wall, the first and second threaded portions being formed on an inner surface of the cylindrical wall.

7. The attachment mechanism of claim 5, further comprising a shroud covering a portion of one of the first receptacle and the second receptacle.

8. The attachment mechanism of claim 5, wherein the first collar and second collar have apertures therethrough, the apertures being shaped for slidable registration along the elongate shaft.

9. The attachment mechanism of claim 5, wherein the elongate shaft has a dimension along its length and a cross-section of the elongate shaft transverse to the dimension is non-circular.

10. The attachment mechanism of claim 9, wherein the first and second collars have an aperture forming a clearance fit with the elongate shaft.

11. The attachment mechanism of claim 10, wherein the openings of the first and second collars have cross-sections substantially the same as the cross-section of the elongate shaft.

12. An adjustable attachment mechanism for adjustably attaching two members, each of the members having a substantially spherical portion, the mechanism comprising:

an elongate shaft;

a first collar translatable along the elongate arm and arranged proximate a first end of the elongate arm, a portion of the first collar being threaded;

a second collar translatable along the elongate arm and arranged proximate a second end of the elongate arm, a portion of the second collar being threaded;

an actuator having a first threaded portion proximate an end and a second threaded portion proximate the other end, the first threaded portion of the actuator registering with the threaded portion of the first collar and the second threaded portion of the actuator registering with the threaded portion of the second collar, the first and second threaded portions having opposite thread orientations;

a first cap secured to the first end of the elongate arm maintaining registration of the first collar with the elongate arm;

a second cap secured to the second end of the elongate arm maintaining registration of the second collar with the elongate arm;

a first containment mechanism secured to the first collar; and a second containment mechanism secured to the second collar, wherein one of clockwise rotation and counter-clockwise rotation of the actuator translates the first collar and the second collar along the elongate arm away from each other and the other of clockwise rotation and counter-clockwise rotation of the actuator translates the first collar and the second collar along the elongate arm toward each other.

13. The mechanism of claim 12 wherein the first collar and the first seat define a first receptacle and the second collar and the second seat define a second receptacle.

14. The mechanism of claim 12 wherein one or both of the first collar and the second collar comprises an outer wall and a portion of the outer wall is threaded.

\* \* \* \* \*